(12) United States Patent
Dupuis et al.

(10) Patent No.: US 6,959,143 B2
(45) Date of Patent: Oct. 25, 2005

(54) ADVERTISING EXTRACTING SYSTEM

(75) Inventors: Jean-Charles Dupuis, Montreal (CA); Jean-François Pouliot, Mount-Royal (CA); Yves Roy, Montreal (CA)

(73) Assignee: Eloda Inc., Montreal ( * ) Notice: Subject to any disclaimer, the term of this patent is extended or adjusted under 35 U.S.C. 154(b) by 1036 days.

(21) Appl. No.: 09/745,483

(22) Filed: Dec. 26, 2000

(65) Prior Publication Data

US 2002/0083440 A1    Jun. 27, 2002

(51) Int. Cl.[7] .......................... H04N 5/85; H04N 5/91; H04N 5/93
(52) U.S. Cl. .......................... 386/125; 386/46; 386/52
(58) Field of Search ................... 386/125, 124, 386/46, 105, 104, 106, 45, 69, 68, 1, 6, 4, 386/52, 55, 126, 40; 360/13; 725/22, 25, 725/28, 32

(56) References Cited

U.S. PATENT DOCUMENTS 5,973,723 A  * 10/1999  DeLuca ..................... 725/34
5,999,689 A  * 12/1999  Iggulden ..................... 386/46

FOREIGN PATENT DOCUMENTS

EP    0967611 A2  *  12/1999

* cited by examiner

Primary Examiner—Robert Chevalier
(74) Attorney, Agent, or Firm—Ogilvy Renault, L.L.P.; Max R. Wood

(57) ABSTRACT

A system and method for extracting advertising segments from a video source, stores the extracted segments in a stractured database to be used in various applications. The system for extracting advertising, or other promotional segments, from a video signal converts the video signal to a digital format, if requied, stores the video signal in a database, scans the video signal for the presence of predetermined characteristics and uses the characteristics to locate a start and an end of each segment.

20 Claims, 3 Drawing Sheets

Advertising Tracking System

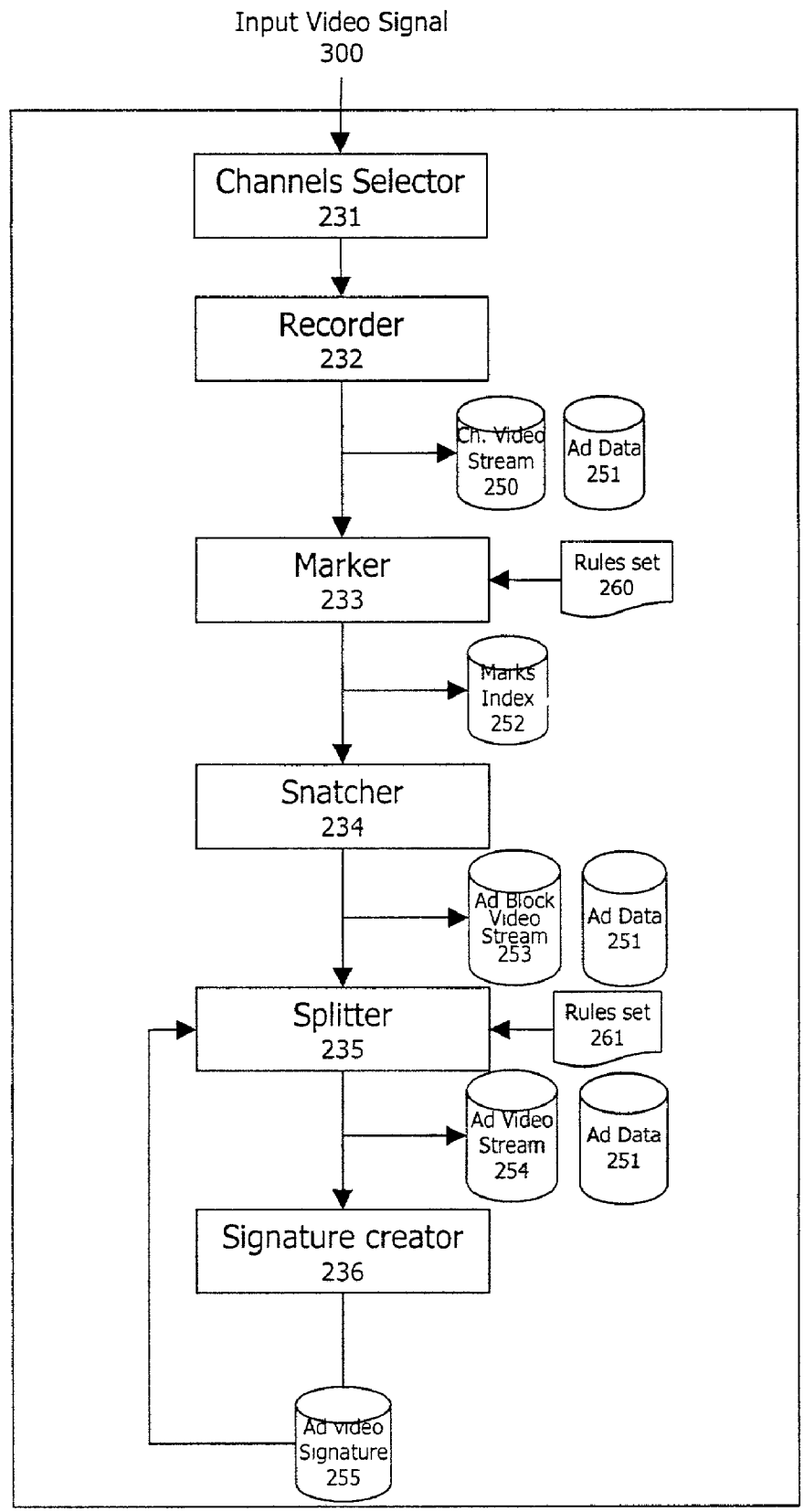
Figure 1. Advertising Extracting System

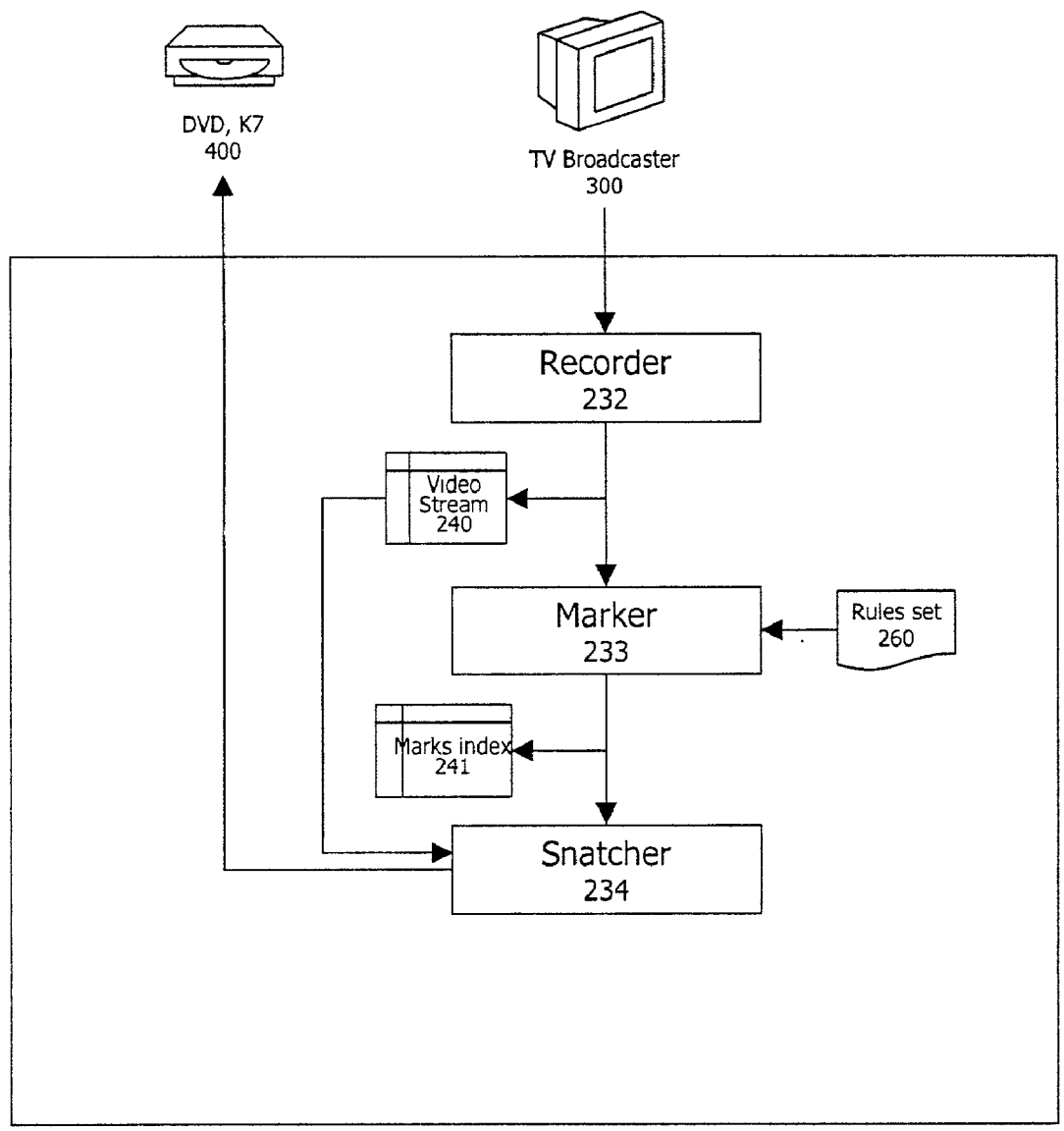
Figure 2. AD Trasher

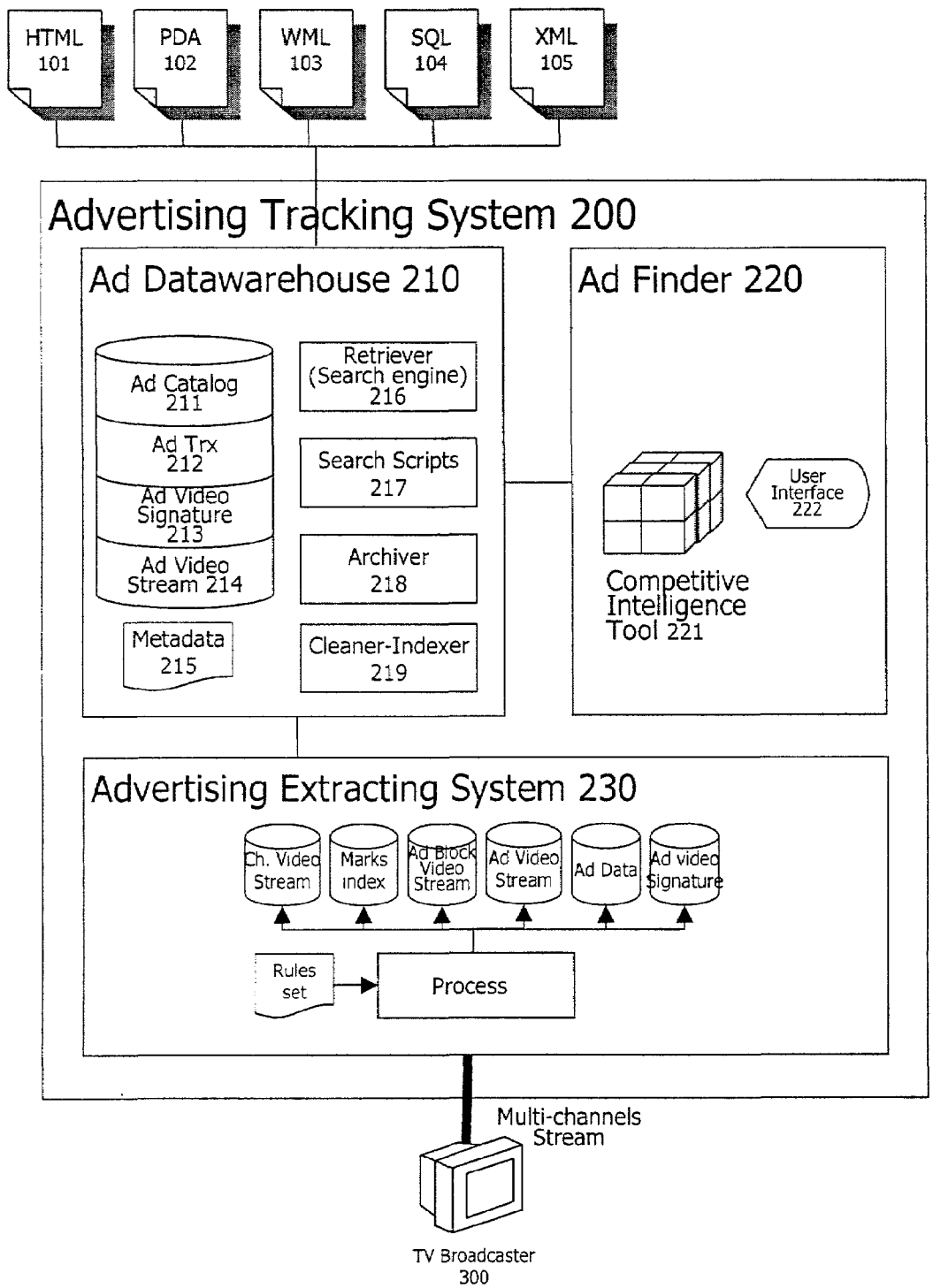
Figure 3. Advertising Tracking System

ADVERTISING EXTRACTING SYSTEM

TECHNICAL FIELD

This invention relates to the field of television as well as the World Wide Web, and more particularly, to a method and system for tracking and retrieving airing television advertising material.

BACKGROUND OF THE INVENTION

With the advent of high-speed internet connections and streaming video technology, transmission of rich media material is becoming more and more frequent on the world wide web. Short length videos can now be quickly downloaded and viewed on nearly all recently purchased home computers with high-speed connections.

Due to their short lengths and high production values, television commercials represent ideal existing material for streaming on the internet. They also represent an important and valuable source of content: many are entertaining, most carry worthy information for the prospective buyer of a product or service and all represent important data for the advertising industry professional in constant need of monitoring the advertising activities of the competition.

Systems have been developed to remove advertising segments from real time television transmissions. See for example U.S. Pat. No. 5,999,689 (Iggulden) and U.S. Pat. No. 6,002,443 (Iggulden).

On another hand, following the internet driven trend of on demand content, many concepts and technologies such as interactive television, on demand television programming, and hard disk television program recording technologies are rapidly evolving to give the consumer the ability to watch what he wants, when he wants it (see for example U.S. Pat. Nos. 5,532,735 and 5,481,542).

Hard disk program recording technologies linked with an internet service such as TiVo and Web TV, for instance, give the television viewer the opportunity to fast forward past the advertising blocks of the recorded material and therefore watch only the material he or she wishes to watch. None though actually extract the advertising blocks from the standard aired material.

U.S. Pat. No. 5,864,823 (Levitan) describes a commercial-on-demand system which requires the use specially coded commercials in conjunction with a computer linked to the internet and to the television signal receiver.

SUMMARY OF THE INVENTION

The Advertising Extracting System ("AES") is a method and system that extracts advertising materials from a video source, describes and stores the extracted materials in a structured database for various applications.

The system for extracting advertising or other promotional segments from a video signal may comprise:
a. means to convert, if necessary, the video signal to a digital format,
b. means for storing said video signal in a database,
c. means for scanning said video signal for the presence of predetermined characteristics,
d. means to associate said characteristics with the start and the end of each such segments.

The method for tracking and retrieving adverting segments from a television signal may comprise the steps of:
a. converting, if necessary, the television signal to a digital format,
b. storing said digital television signal in a database,
c. scanning the television signal for the presence of predetermined characteristics,
d. identifying the start and end of such advertising segments with the use of such characteristics.

BRIEF DESCRIPTION OF THE DRAWINGS

FIG. 1 is a block diagram of the Advertising Extracting System showing the different processing step to extract advertising material from an original video signal and store it in databases for the purpose of visioning or removing the advertising material as shown in FIGS. 2 and 3.

FIG. 2 is a block diagram of a system called AD Trasher, an application using the Advertising Extracting System, that generates from an original video signal a new video stream free of advertising material.

FIG. 3 is another application using the Advertising Extracting System. The figure shows a conceptual architecture diagram of a system called Advertising Tracking System ("ATS"), that uses the Advertising Extracting System as one of its constituents. The ATS provides an advanced repository of TV advertising material with a complete set of sophisticated tools to exploit the content for information retrieval and competitive intelligence purposes. Also, the ATS provides a database of recent advertising material with searching and viewing capabilities to help consumers in their decision making process before buying products or services.

DETAILED DESCRIPTION OF A PREFERRED EMBODIMENT

General Description

Referring to FIG. 1, the Advertising Extracting System comprises 6 steps:
1. The Channels Selector 231 splits apart a multi-channel video signal from a broadcaster, such as a TV Broadcaster, to direct each channel separately to a Recorder module.
2. The Recorder 232 picks up the video signal coming from the Channels Selector, converts the signal to an uncompressed digital format if required, and stores the signal on a permanent storage medium. All the information of the original signal is preserved (eg. Video Interval Time Code information). This data store is called the 'Channel Video Stream' file 250. A record is created in the Ad Data database 251. The record contains some basic data or information about the channel video stream such as the channel identification, date and time of recording, duration, recording speed, stream length.
3. The Marker 233 scans the Channel Video Stream file 250 and creates the Marks Index database 252. The index database contains marks records, each identifying the relative position from the start of the stream, of the beginning and end of an advertising block contained in the stream. The marking is based on a Rules Set 260 containing rules such as: Advertising material audio level is 3 to 6% higher than other type of material; Presence of a black frame before and after the advertising block; VITC (Video Interval Time Code) cues, in line 20, identifying an advertising interval for insertion purposes; Advertising interval time ranging from a minimum of 2 minutes to a maximum of 5 minutes; Standard-industry ratio for advertising time allowed per hour. The Rules Set 260 will evolve in time to adjust to changing format and encoding of video signal in the broadcasting industry. A record is created for each advertising block identified.

4. The Snatcher 234 reads the relative position of a marks index record of the Marks Index database 252 to position the Channel Video Stream file 250 at the beginning of an advertising block and starts copying the video stream file into a Ad Block Video Stream file 253 until it encounters the end mark for that advertising block. A record is created in the Ad Data database 251 along each Ad Block Video Stream 253. The record contains information about the advertising block such as channel source, date & time, duration, audio level, stream length.

5. The Splitter 235 reads the Ad Block Video Stream 253 and split apart the different advertisement spots and record each of them in a separate Ad Video Stream file 254. The splitting of the stream is based on a Rules Set 261 that contains rules such as: black frame at beginning and end of the spot; spot length must be a multiple of 15 seconds but not longer than 90 seconds; MPEG analysis of frames sequence for significant frames differential. The Splitter can search the Ad Video Signature file for a match with existing advertiment spots. In case of failure to identity advertisement spots within an Ad Block Video Stream 253, human intervention may be required. The Rules Set 261 will evolve in time to adjust to changing format and encoding of video signal in the broadcasting industry. A record is created in the Ad Data database 251 along each Ad Video Stream file 254. The record contains information about the advertisement spot such as channel source, date & time, duration, audio level, stream length.

6. The Signature Creator 236 copies some frames from the Ad Video Stream file 254 at different standard intervals in the advertisement spot to create the advertisement spot signature. The advertisement spot signature is used to recognize the already recorded spots. These frames constitute the Ad Video Signature file 255.

Description of AD Trasher Application

Referring to FIG. 2, the AD Trasher is an application which uses the Advertising Extracting System to generate, from the original video signal, a new video stream free of advertising material.

The Ad Trasher contains the basic functionalities that can be installed on a consumer's equipment, being a videocassette or DVD recorder 400 or any other means. The Ad Trasher is extracting advertising material from a broadcasted video stream to generate an advertising free video stream to be recorded on the consumer's equipment. The consumer has the capability of recording and viewing broadcasted video content free of advertising material.

The Ad Trasher comprises 3 basic steps. These steps run simultaneously in a near real-time fashion:

1. The Recorder 232 processes the input video signal such as a TV channel 300, converts the signal to an uncompressed digital format if required, and stores it in a permanent storage module of the recording equipment. This data store is called the Channel Video Stream file 240.

2. With some delay on the Recorder 232 step, the Marker step 233 starts scanning the Channel Video Stream file 240 and creates the Marks Index database 241 in the permanent storage module. The index database contains marks records, each identifying the relative position from the start of the stream, of the beginning and end of an advertising block contained in the stream in the permanent storage module. The marking is based on a Rules Set 260 containing rules such as: Advertising material audio level is 3 to 6% higher than other type of material; Presence of black frame before and after the advertising block; VITC (Video Interval Time Code) cues, in line 20, identifying an advertising interval for insertion purposes. In case of mismatch in marks doublet (start, end), the Marker 233 simply discard the unpaired mark.

3. The Snatcher step 234 turns on the transcription of the video signal from the Channel Video Stream file 240 on the consumer's recording equipment while reading the relative position of a marks index record of the Marks Index database 241. Once it reaches the start position of an Advertising block in the Channel video stream file 240, the Snatcher turns off the transcription of the video signal until it reaches the end position where it return to the previous mode.

Description of the Advertising Tracking System

Referring to FIG. 3, the Advertising Tracking System 200 is an application using the Advertising Extracting System.

The ATS provides an advanced repository of video advertising material with a complete set of sophisticated tools to exploit the content for information retrieval and competitive intelligence purposes. Also, the ATS provides a database of recent advertising material with searching and viewing capabilities to help consumers in their decision making process before buying products or services.

The ATS interacts with external systems: some of them feed the ATS and other feed on the ATS.

At the bottom of the figure, a video signal broadcaster such as a TV or Web TV broadcaster 300, typically cable, satellite and wireless media companies, provide a multichannels video stream. This is the input or feed to the ATS.

At the top of the figure are the different interfaces available for the different users of the ATS. The large content of the Ad Datwarehouse 210 is available through HTML 101, PDA 102, WML 103, SQL 104, XML 105 or other future standard interface protocols. The content is accessible namely through a desktop PC, a Personal Digital Assistant (PDA), a wireless device supporting Wireless Markup Language, an external system using SQL request or XML exchange standard, television video player and MPEG player or any other means.

The Advertising Tracking System 200 is made of three sub-systems: Ad Datawarehouse 210, Ad Finder 220 and the Advertising Extracting System 230.

The Advertising Extracting System 230 extracts advertising material from the broadcasted video stream, describes and stores the advertisement spots to be uploaded to the Ad Datawarehouse 210.

The Ad Datawarehouse contains a large database that is divided into four parts: First, the Ad Catalog 211 which contains a complete index of all the adverting material captured into the Datawarehouse with an extensive set of attributes describing an ad. This index is used for search and retrieval purposes of ad material or information or statistics.

Second, the TRX Database 212 contains a record for each appearance of the ads material in every broadcasted video content on every channels that are fed in the ATS. With this database, the number of times an advertising material was broadcasted on a particular channel at a specific date and time could be easily computed.

Third, the Ad Video Signature database 213 contains all the video signature for all advertisement spots in the Ad Catalog. This database is used to find if an advertisement spot already exists in the datawarehouse.

Finally, the Ad Video Stream database 214 contains all the video stream recording, in MPEG or any other compression format, of all the advertising material indexed in the Ad Catalog.

The metadata 215 is describing the data and relationship structures of the Ad Datawarehouse database.

The Retriever 216 is the search engine to search the Ad catalog with specific criterias such as the advertiser, brand, product. Preset Search Scripts 217 are stored within the Ad Datawarehouse and correspond to standard and frequently used searching criterias.

Finally, a datawarehouse contains a large amount of data over time, therefore, the Archiver 218 function is to manage that large repository, making backup of the database content for security purpose, transferring old data to an offline media support and recovering the space in the datawarehouse to maintain good performance, and retrieving data on the offline media support on request.

The Cleaner-Indexer 219 is a semi-automated function. It processes the files and databases generated by the Advertising Extracting System 230. An automated search for an identical Ad Video Signature file content is made against all recently created Ad Signature Video files in the Ad Datawarehouse. If a match is found, the Ad Signature and Ad Video Stream are discarded, and the Ad Data record is transferred in the Ad Trx 212 of the datawarehouse. If no match is found, an entry in the Ad Catalog is made, the Ad Signature as well as the Ad Video Stream are copied in the Ad Signature 213 and Ad Video Stream 214 databases of the datawarehouse. A set of attributes fully describing the new ad in the Ad Catalog is created with human intervention. Such attributes are type of ad, the season, geographical location, characters, etc.

The Ad Finder sub-system 220 is a business intelligence tool for competitive analysis purposes. The Competitive Intelligence tool 221 is a multi-dimensional data repository describing different perspectives or accesses to the large database of the Ad Datawarehouse.

While certain novel features of the invention have been shown and described and are pointed out in the annexed claims, it will be understood that various omissions, substitutions and changes in the forms and details of the elements illustrated and their operation can be made by those skilled in the art without departing from the spirit of the invention.

We claim:

1. A system for extracting advertising or other promotional segments from a video signal comprising:
   means for converting, if required, the video signal to a digital format;
   means for storing said video signal in a database;
   means for scanning said video signal for the presence of predetermined characteristics; means to associating said characteristics with a start and an end of each said segments; and
   means for storing said segments without a remainder of said video signal.

2. The system as claimed in claim 1 further comprising means for separately storing said segments and the remainder of said video signal.

3. The system as claimed in claim 1 wherein said predetermined characteristics include a presence of a black frame before and after said segment.

4. The system as claimed in claim 1 wherein said predetermined characteristics include a presence of a predetermined video internal time code cue.

5. The system as claimed in claim 1 wherein said predetermined characteristics include a presence of a higher average audio level.

6. The system as claimed in claim 5 wherein said audio level is at least 3% higher than that of an immediately preceding portion of the video signal.

7. The system as claimed in claim 6, wherein the higher average audio level is between 3% and 6% of that of the immediately preceding portion of the video signal.

8. The system as claimed in claim 1, wherein said predetermined characteristics include a predetermined duration of said segments.

9. The system as claimed in claim 8, wherein said duration is 15 seconds or a multiple thereof.

10. The system as claimed in claim 1 further comprising means for storing said segments in a database.

11. The system as claimed in claim 10 further comprising means for storing predetermined information relating to said segments in a database.

12. The system as claimed in claim 11 wherein said information includes a source of the video signal, a start time and date, an end time and date, and a summary of a content of the segment.

13. The system as claimed in claim 10 further comprising means for storing frames extracted from each said segment at predetermined time intervals.

14. The system as claimed in claim 13 further comprising means for storing predetermined information relating to said segments in a database.

15. The system as claimed in claim 14 wherein said information includes a source of the video signal, a start time and date, an end time and date, and a summary of a content of the segment.

16. The system as claimed in claim 1, further comprising means for storing said video signal after said segments have been removed therefrom.

17. A method for tracking and retrieving adverting segments from a television signal, comprising:
    converting, if required, the television signal to a digital format;
    storing said digital television signal in a database;
    scanning the television signal for the presence of predetermined characteristics; identifying a start and an end of said advertising segments using said predetermined characteristics; and
    creating a signature for each segment using frames taken at predetermined internals between the start and the end of each segment.

18. The method as claimed in claim 17 wherein each signature is stored in a database.

19. The method as claimed in claim 18 wherein said segments are selectively retrieved from said database.

20. The method as claimed in claim 17 further comprising:
    storing said segments in a database; and
    storing said characteristics in a database.

* * * * *